United States Patent
Kojima et al.

(10) Patent No.: US 10,164,233 B2
(45) Date of Patent: Dec. 25, 2018

(54) LITHIUM ION SECONDARY BATTERY COMPRISING A HEAT SEALED SEPARATOR

(71) Applicant: NEC ENERGY DEVICES, LTD., Sagamihara-shi, Kanagawa (JP)

(72) Inventors: Ikuo Kojima, Sagamihara (JP); Tomoyuki Ichikawa, Sagamihara (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 0 days.

(21) Appl. No.: 15/129,253

(22) PCT Filed: Apr. 9, 2015

(86) PCT No.: PCT/JP2015/061062
§ 371 (c)(1),
(2) Date: Sep. 26, 2016

(87) PCT Pub. No.: WO2015/156344
PCT Pub. Date: Oct. 15, 2015

(65) Prior Publication Data
US 2017/0110703 A1    Apr. 20, 2017

(30) Foreign Application Priority Data
Apr. 9, 2014   (JP) .................................. 2014-080166

(51) Int. Cl.
*H01M 2/18* (2006.01)
*H01M 10/052* (2010.01)
(Continued)

(52) U.S. Cl.
CPC .......... *H01M 2/18* (2013.01); *H01M 10/052* (2013.01); *H01M 10/0525* (2013.01);
(Continued)

(58) Field of Classification Search
None
See application file for complete search history.

(56) References Cited

U.S. PATENT DOCUMENTS

| | | | | |
|---|---|---|---|---|
| 945,094 A | * | 1/1910 | Zahn | B65D 5/6697 229/125.11 |
| 2,934,585 A | * | 4/1960 | Zahn | H01M 2/18 29/623.4 |

(Continued)

FOREIGN PATENT DOCUMENTS

| | | | | |
|---|---|---|---|---|
| GB | 945094 A | * | 12/1963 | ............. H01M 2/18 |
| JP | 7-272761 A | | 10/1995 | |

(Continued)

OTHER PUBLICATIONS

JP2012-033399A to Hitoshi et al. English Machine Translation—2012.*

(Continued)

*Primary Examiner* — Lucas J. O'Donnell
(74) *Attorney, Agent, or Firm* — Sughrue Mion, PLLC

(57) ABSTRACT

To provide a lithium ion secondary battery that is less likely affected by vibration, shock, or the like.
A stacked lithium ion secondary battery is characterized in that separators, which are stacked with positive and negative electrodes, are a flat bag or flat tube with at least one side of an outer periphery thereof intermittently heat-sealed; the heat-sealed side is provided with concave and convex portions made up of straight lines or curves or a combination of straight lines and curves; the outer periphery of the separator made with the concave and convex portions is positioned outside the outer periphery of the negative electrode along with the concave and convex portions; and the outer periph- (Continued)

ery of the negative electrode is positioned outside the outer periphery of the positive electrode housed in the bag-shape or tubular separator.

4 Claims, 7 Drawing Sheets

(51) Int. Cl.
*H01M 10/0585* (2010.01)
*H01M 10/0525* (2010.01)

(52) U.S. Cl.
CPC .... *H01M 10/0585* (2013.01); *H01M 2220/20* (2013.01); *Y02E 60/122* (2013.01); *Y02T 10/7011* (2013.01)

(56) References Cited

U.S. PATENT DOCUMENTS

2014/0147724 A1 5/2014 Kim et al.
2014/0349167 A1 11/2014 Wakai et al.

FOREIGN PATENT DOCUMENTS

| | | |
|---|---|---|
| JP | 1055795 A | 2/1998 |
| JP | 2003-017112 A | 1/2003 |
| JP | 2003-45499 A | 2/2003 |
| JP | 2003-217674 A | 7/2003 |
| JP | 2007-201248 A | 8/2007 |
| JP | 2008-27865 A | 2/2008 |
| JP | 2008130360 A | 6/2008 |
| JP | 2008-269819 A | 11/2008 |
| JP | 2012-33399 A | 2/2012 |
| JP | 2012-227117 A | 11/2012 |
| JP | 2013-143336 A | 7/2013 |
| JP | 2014003002 A | 1/2014 |

OTHER PUBLICATIONS

International Search Report for PCT/JP2015/061062 dated Jun. 16, 2015.
Communication dated Jun. 21, 2018, from the State Intellectual Property Office of People's Republic of China in counterpart Application No. 201580018104.8.

* cited by examiner

LITHIUM ION SECONDARY BATTERY COMPRISING A HEAT SEALED SEPARATOR

CROSS REFERENCE TO RELATED APPLICATIONS

This application is a National Stage of International Application No. PCT/JP2015/061062 filed Apr. 9, 2015, claiming priority based on Japanese Patent Application No. 2014-080166 filed Apr. 9, 2014, the contents of all of which are incorporated herein by reference in their entirety.

TECHNICAL FIELD

The present invention relates to a lithium ion secondary battery and to a lithium ion secondary battery that includes a thin-plate positive electrode housed in a bag- or tube-like separator and a negative electrode, which are stacked and sealed with a film-like exterior material.

BACKGROUND ART

Equipment that uses batteries as its driving power source, such as electric bicycles, electric motorcycles and electric vehicles, employs a battery pack in which large-capacity secondary batteries are housed. Lithium ion secondary batteries, which are large in both volumetric energy density and mass energy density, are suitable as batteries for driving power sources.

Among those known are a columnar lithium ion secondary battery in which strip-like positive and negative electrodes are stacked via separators before being wound, and a flat lithium ion secondary battery in which thin-plate positive and negative electrodes are stacked via separators.

Among them, flat batteries are especially suitable for power-source batteries of power motors and others since the capacity per unit battery can be easily raised by increasing the area or number of positive and negative electrodes stacked.

The unit batteries of a flat lithium ion secondary battery have their battery elements covered with the film-like exterior material. In this manner, the high energy density of the lithium ion secondary battery is effectively used.

In the lithium ion secondary battery, in order to prevent metal lithium from being deposited in dendrites due to the concentration of current into a corner portion of a negative electrode during charging, the dimensions of positive electrodes, separators and negative electrodes are appropriately determined. That is, as for the stacking-position relationship between the coating section of the positive electrode active material, the coating section of the negative electrode active material and the separators, the dimensions of the separators are the largest. Moreover, the outer periphery of the separators are positioned outside the outer peripheries of the coating section of the positive electrode active material and of the coating section of the negative electrode active material. In addition, the dimensions of the coating section of the positive electrode active material are the smallest, and the outer periphery of the coating section of the positive electrode active material is positioned closer to the inner side than the outer peripheries of the separators and of the coating section of the negative electrode active material.

When used at high temperature, the separators would significantly contract thermally. There is one proposed technique by which the shape of separators are set larger in advance with a heat shrinkage rate in mind so that the thermal contraction of the separators does not lead to the positive and negative electrodes being short-circuited (Refer to Patent Documents 1 and 2, for example).

The positive and negative electrodes of the lithium ion secondary batteries are produced by applying and drying slurry, which is made by mixing active material and particles of a conductive auxiliary agent with a binder. Accordingly, there are concerns that, when being subjected to vibration or shock as a result of the battery falling or any other problem, the battery could see the active material come off or the electrodes broken or any other trouble.

Moreover, in the stack of thin-plate positive and negative electrodes, the outer periphery of the thin-plate negative electrodes are situated closer to the exterior body than the outer periphery of the thin-plate positive electrodes. Therefore, the thin-plate negative electrodes are more affected by external shock as a result of contact with the exterior body.

Meanwhile, as disclosed in Patent Documents 1 and 2, if the outer periphery of the separators are positioned outside the portions excluding the non-coating sections of the active material, the separators, which are exposed from the stack more than the electrodes, would serve as a cushioning member for weak shock. Such a configuration is expected to reduce such troubles as the breaking of the electrodes or the dropping of the active material.

There is also a proposed battery: Instead of providing or inserting separators between positive and negative electrodes, the positive electrodes are contained in bag-shape separators; and the bag-shape separators containing the positive electrodes, and the negative electrodes are stacked alternately (Refer to Patent Documents 3 or 4, for example).

The insertion of the positive electrodes into the bag-shape separators prevents the active material from adhering to the counter electrode, with the help of the bag-shape separators, even if the positive electrode active material or the negative electrode active material comes off from a current collector. This prevents the quality deteriorating.

When the bag-shape separators are produced, wrinkles will likely appear due to thermal contraction. In Patent Document 3, the heat sealing of the separators is conducted at certain intervals to prevent such wrinkles appearing.

PRIOR ART DOCUMENTS

Patent Documents

[Patent Document 1] JP 2003-045499A
[Patent Document 2] JP 2003-217674A
[Patent Document 3] JP 07-272761A
[Patent Document 4] JP 2012-033399A

SUMMARY OF THE INVENTION

Problems to be Solved by the Invention

As a result of intensive studies, inventors found that, when bag-shape or tubular separators are put to use, the positive electrodes inside the bag-shape or tubular separators, as well as the negative electrodes, are affected by external vibration or shock as well.

The heat-sealed bag-shape or tubular separators have an electrode storage section whose size is slightly larger than the outer size of electrodes, meaning that the electrode storage section is only large enough to house the electrodes. However, the size of the two could be almost equal when the separators thermally contracted.

Moreover, heat-sealing sections on the periphery of the electrodes have been crystallized after the separators softened or melted. Therefore, their softness are lower compared with before the sections were heat-sealed. Therefore, if the sealed portions come in contact with the positive electrodes due to vibration or shock, the active material could drop off from the electrodes.

After dropping off, the active material would remain in the separators. However, the capacity could decrease if large amounts of active material drop. If the electrodes cracked as a result of the active material coming off, this was not preferred because the separators could be damaged.

The present invention is intended to solve the above-described problems associated with the use of bag-shape or tubular separators. It is to prevent the positive and negative electrodes being cracked by vibration or shock. It is to reduce the chance of the positive electrode active material and negative electrode active material coming off, as well as to provide batteries that are excellent in electrical characteristics and safety.

Means for Solving the Problems

To solve the problems of the present invention, a stacked lithium ion secondary battery includes an exterior body that houses electrolyte and battery elements stacked via thin-plate positive electrodes coated with positive electrode active material, thin-plate negative electrodes coated with negative electrode active material, and separators, wherein: the separator is a flat bag or flat tube with at least one side of an outer periphery thereof intermittently heat-sealed; the heat-sealed side is provided with concave and convex portions made up of straight lines or curves or a combination of straight lines and curves; the outer periphery of the separator made with the roughness portions is positioned outside the outer periphery of the negative electrode along with the concave and convex portions; and the outer periphery of the negative electrode is positioned outside the outer periphery of the positive electrode housed in the bag-shape or tubular separator.

Advantages of the Invention

According to the present invention, the active material is unlikely to come off both the positive and negative electrodes even when being subjected to vibration or shock, and cracks rarely appear. In particular, even when only positive electrodes are inserted into the bag-shape or tubular separators, the chance of cracks appearing on the positive and negative electrodes under vibration or shock is low, and the active material is unlikely to come off. In this manner, it is possible to provide batteries that are excellent in electrical characteristics and safety.

BEST MODE FOR CARRYING OUT THE INVENTION

Hereinafter, the present invention will be described with reference to the accompanying drawings.

Figure 1:
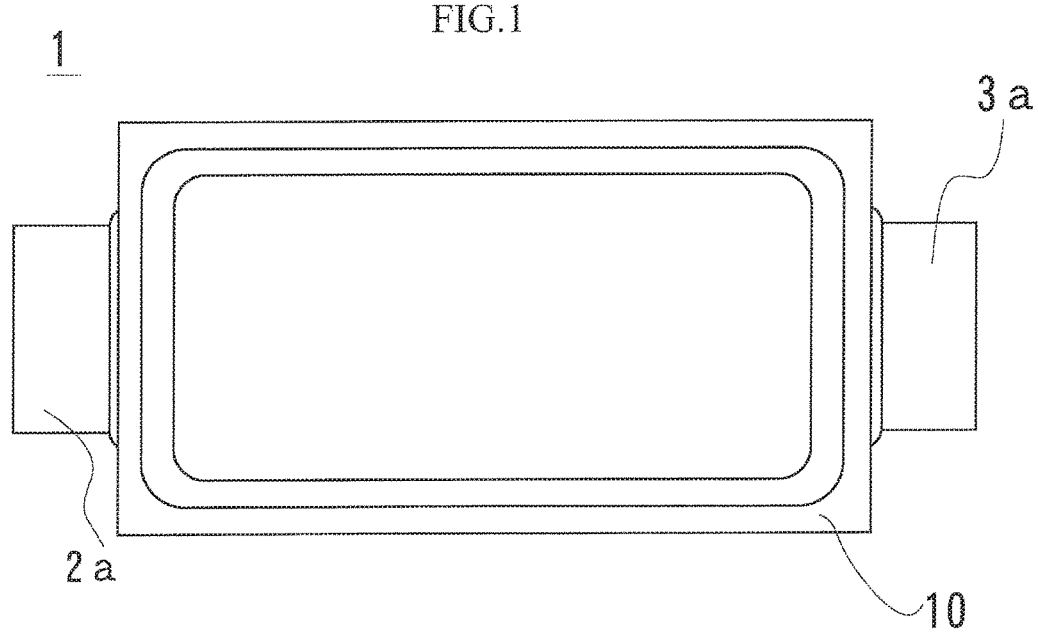
FIG. 1 is a plan view showing the appearance of a lithium ion secondary battery according to the present invention.
Figure 2:
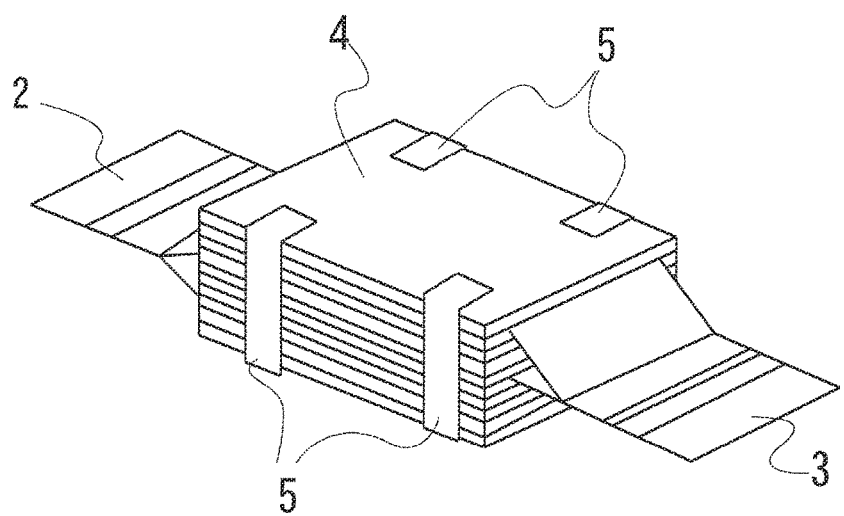
FIG. 2 is a perspective view of an assembly of battery elements of a lithium ion secondary battery according to the present invention.

FIG. 1 is a plan view showing the appearance of a lithium ion secondary battery according to the present invention. FIG. 2 is a perspective view of an assembly of battery elements of a lithium ion secondary battery according to the present invention.

In a lithium ion secondary battery 1, battery elements 4 are sealed inside an exterior body 10 along with an electrolysis solution. One ends of positive electrode terminals 2 and negative electrode terminals 3 of the battery elements are pulled out of the exterior body 10 as a positive electrode terminal exposure portion 2a and a negative electrode terminal exposure portion 3a. The exposure portions function as external terminals, which are to be connected to external devices and others.

The exterior body may be made of flexible film or a can case. In terms of making the battery light, the flexible film is preferred. The flexible film may have a heat-sealing layer on the inner side of a metal layer, which prevents the leakage of electrolysis solution or the entry of water from the outside, with a protective layer provided on the outer side. More specifically, polyethylene or the like may be provided on the inner side; on the metal layer, aluminum foil and stainless steel foil may be provided; and on the outer side, nylon or polyethylene terephthalate film may be formed.

The positive electrode terminals may be made of aluminum or aluminum alloy. The negative electrode terminals may be made of copper, copper alloy, or nickel-plated copper or copper alloy.

On the sides where no positive or negative electrodes of the battery elements 4 are provided, fixing members 5, such as tape, are preferably provided in order to prevent the positive and negative electrodes housed and stacked inside the bag-shape or tubular separator from shifting.

FIG. 2 shows an example in which four long fixing members are used to fix: the fixing members extend on the sides where no positive or negative electrodes are provided, from the outermost layer of one battery element to the outermost layer of the other. This configuration can be adjusted when necessary, depending on the size of electrodes, the number of electrodes stacked and other factors.

Figure 3A:
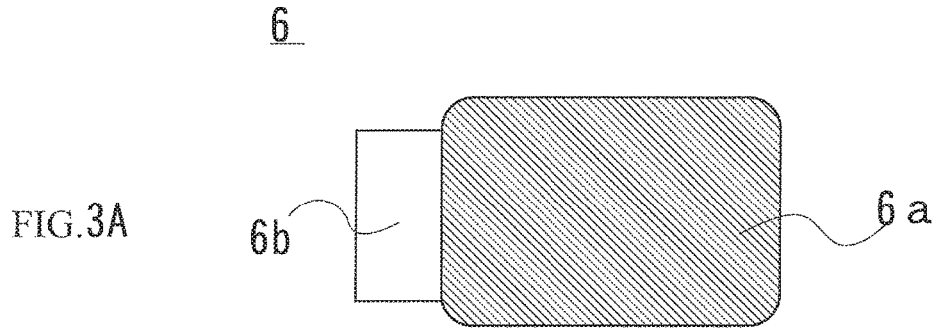
FIG. 3 is a diagram showing one example of positive and negative electrodes of a lithium ion secondary battery according to the present invention.
Figure 3B:
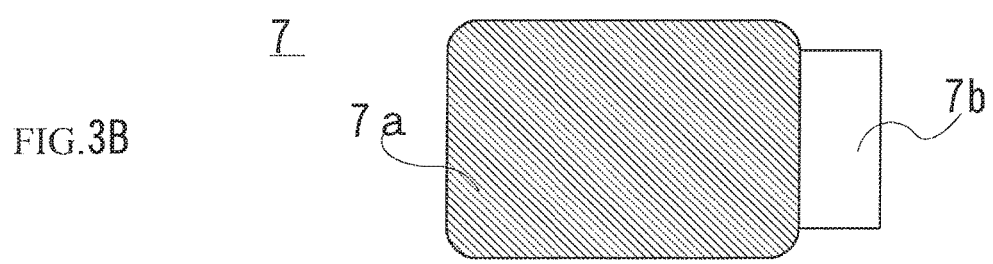

FIG. 3 is a diagram for explaining thin-plate positive and negative electrodes, which are used in the battery elements illustrated in FIG. 2. FIG. 3A shows a positive electrode 6, and FIG. 3B shows a negative electrode.

The positive electrode includes a positive electrode active material coating section 6a, where an active material is applied to a positive electrode current collector; and a positive electrode active material non-coating section 6b, where no active material is applied so that the section is connected to an electrode terminal. The negative electrode similarly includes a negative electrode active material coating section 7a and a negative electrode active material non-coating section 7b.

The positive electrode active material includes lithium transition metal composite oxides, such as $LiCoO_2$, $LiNiO_2$, $LiNi_yCo_{1-y}O_2$ (y=0.01 to 0.99), $LiMnO_2$, $LiMn_2O_4$, $LiNi_xCo_yMn_zO_2$ (x+y+z=1), $LiMPO_4$ (M: Fe, Mn, Ni), or $Li_2MPO_4F$ (M: Fe, Mn, Ni). One of the substances, or a mixture of two or more of the substances, may be used.

The negative electrode active material includes: carbon materials, such as graphite, amorphous carbon and carbon nanotubes; alloy materials, such as lithium metal materials, silicon and tin; oxide-based materials, such as $Nb_2O_5$ and $TiO_2$; and compounds of those substances.

The positive electrode current collector may be made of aluminum, stainless steel, nickel, titanium or an alloy of those substances. In particular, aluminum is preferred. The negative electrode current collector may be made of copper, stainless steel, nickel, titanium or an alloy of those substances.

FIG. 4 is a diagram for explaining how a thin-plate positive electrode is being inserted into a bag-shape or tubular separator.

The separator 8 has a peripheral portion where two rectangular separators are put together; at least the side 8a of the peripheral portion, through which the thin-plate positive electrode is inserted, is open. The sides 8b and 8d, which are adjacent to the side 8a, are closed after being heat-sealed or folded. The side 8c, which is the opposite side from the side 8a from which the positive electrode terminal 6b is taken out, is closed after being heat-sealed or folded. The closure of the side 8c turns the separators into a bag-shape separator. Leaving the side 8c open results in a tubular separator.

Polyolefin-based separators are preferably used. For example, single-layer separators, which are made of polypropylene or polyethylene or a combination of them, or multilayer separators may be used. The shrinkage factor of the separator may significantly vary depending on the in-plane direction. In such a case, it is preferred that the direction in which the shrinkage factor is small is aligned with an opening for the insertion of an electrode or with the direction in which an active material non-coating section exists to be connected to an electrode terminal. An end portion of the separator in the direction in which a terminal is taken out may not be sealed. Even in such a case, the separator contracts significantly when the battery goes wrong, thereby preventing the active material non-coating section from being exposed.

Figure 4A:
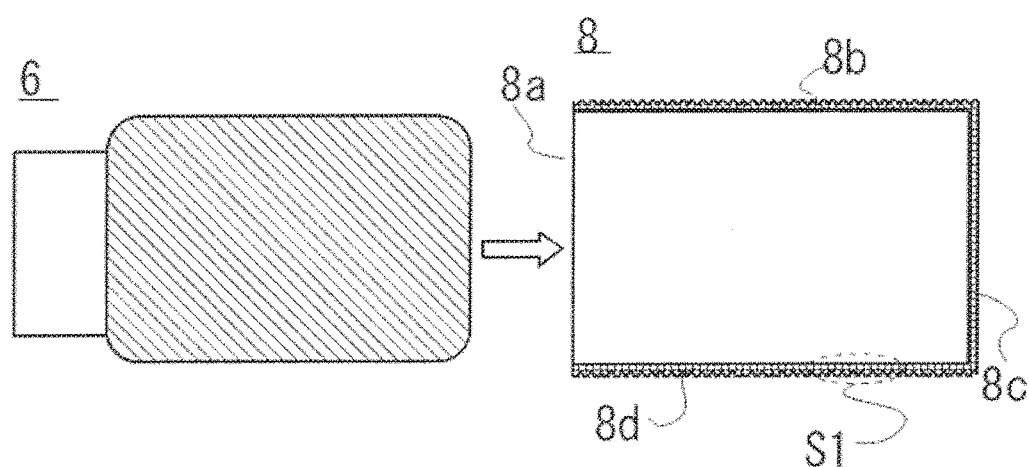
FIG. 4 is a diagram for explaining one example of a bag-shape separator of a lithium ion secondary battery diagram of the present invention, as well as a positive electrode being inserted into the separator.
Figure 4B:
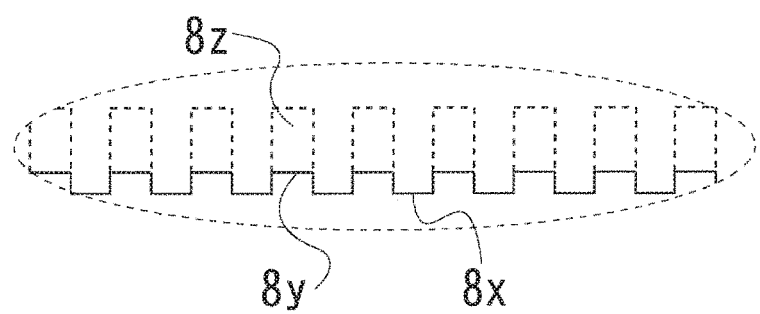

FIG. 4B is a diagram for explaining in detail the state of a heat-sealed portion, surrounded by broken line S1 in FIG. 4A.

In order to prevent a thermal contraction associated with the heat-sealing of the outer periphery from causing wrinkles on the separator, the outer periphery of the separator is heat-sealed at certain intervals. According to the present invention, heat-sealing portions 8z are provided on the end portions of the separator or in the areas close to the end portions, in such a way as to generate convex and concave portions 8x and 8y on the outer periphery of the separator.

FIG. 4B shows the pectinate shape. However, the concave and convex shape may be a combination of wavy shapes, straight lines and curves. At this time, the average w1 of the distances of differences of peaks of the adjacent convex and concave portions is preferably greater than or equal to 0.3 mm and less than or equal to 3 mm. The reason will be explained later with reference to FIG. 8.

Figure 5:
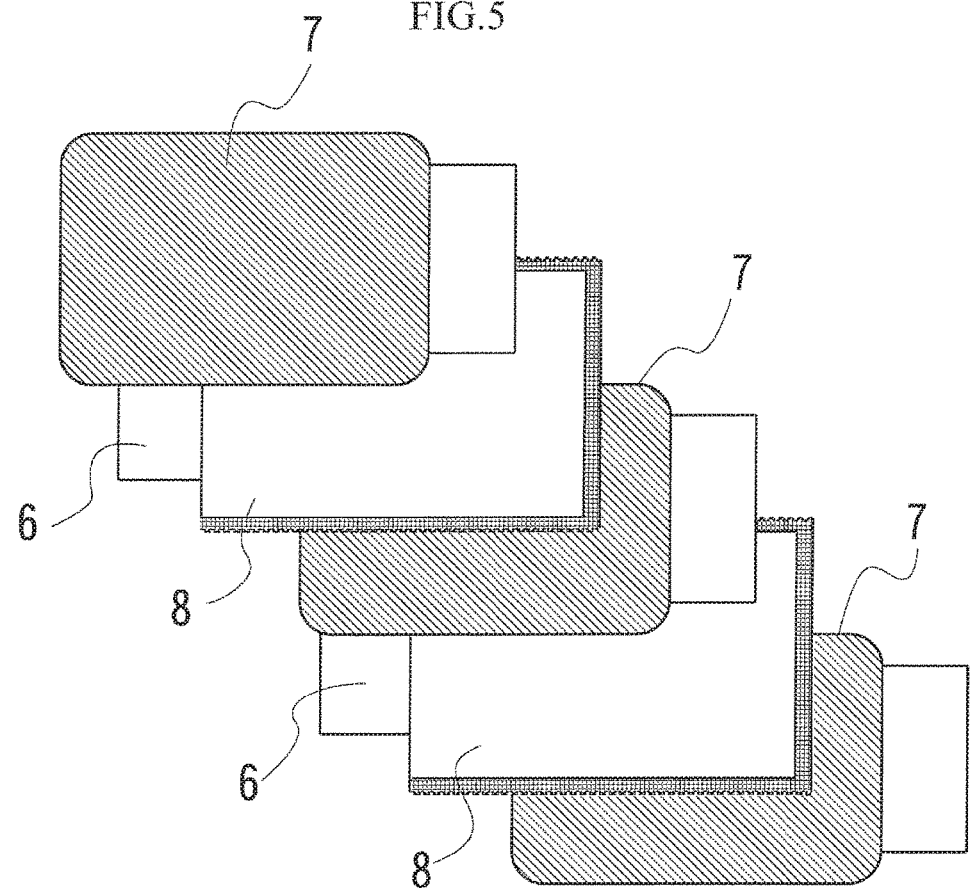
FIG. 5 is a diagram for explaining how bag-shape separators, into which positive electrodes of a lithium ion secondary battery of the present invention have been inserted, and negative electrodes are stacked.

FIG. 5 is an exploded view for explaining how thin-plate positive electrodes 6, housed in the bag-shape separator, and thin-plate negative electrodes 7 are stacked. The diagram only shows two thin-plate positive electrodes that are inserted into the bag-shape separators and three thin-plate negative electrodes.

The thin-plate positive electrodes 6, housed in the bag-shape separator 8, and thin-plate negative electrodes 7 are prepared, and the thin-plate positive electrodes 6 and the thin-plate negative electrodes 7 are alternately stacked.

The non-coating sections of the positive electrode are pulled out from the same side, and the non-coating sections of the negative electrode are pulled out from the same side. As shown in the diagram, the non-coating sections of the positive electrode and the non-coating sections of the negative electrode are not necessarily disposed on the sides facing each other. For example, if the width of the non-coating sections of the positive and negative electrodes, or the pull-out positions, are changed, the non-coating sections of the positive electrode and the non-coating sections of the negative electrode can be placed on the same side.

Figure 6:
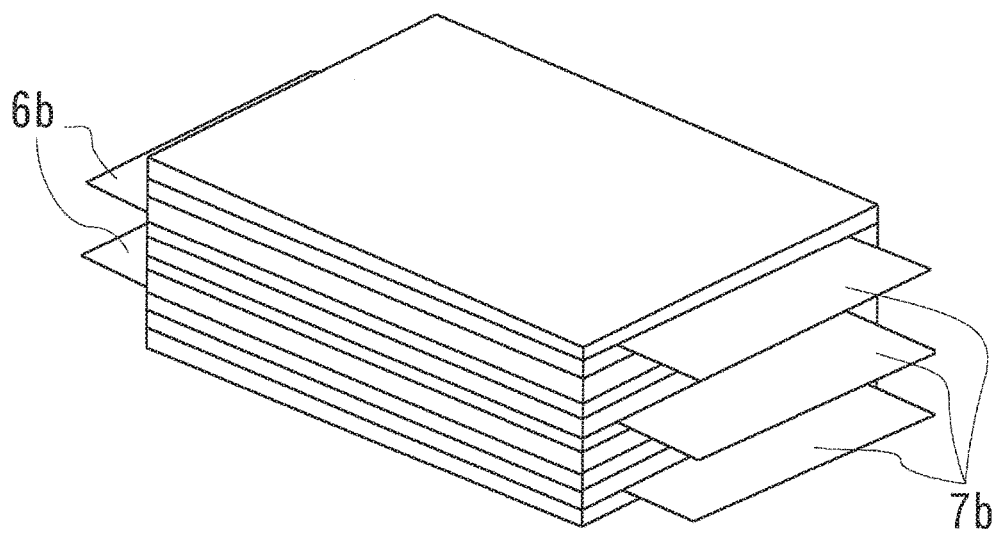
FIG. 6 is a diagram for explaining battery elements of a lithium ion secondary battery of the present invention.

FIG. 6 is a diagram for explaining a battery element in which thin-plate positive electrodes, housed in the bag-shape separators, and thin-plate negative electrodes are stacked.

As for the thin-plate positive electrodes, housed in the bag-shape separators 8, and thin-plate negative electrodes 7, the outer size of the bag-shape separators 8 is set equal to the outer size of the thin-plate negative electrodes 7. Accordingly, a predetermined number of electrodes can be alternately stacked, with the end portions of the electrodes aligned with one another.

Figure 7:
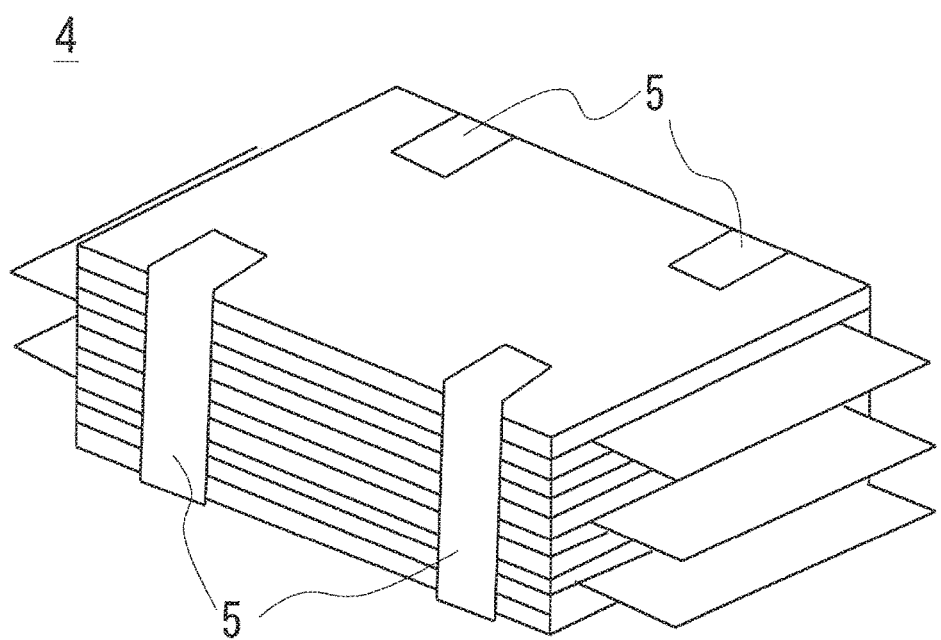
FIG. 7 is a diagram for explaining battery elements of a lithium ion secondary battery of the present invention.

FIG. 7 is a diagram for explaining a battery element completely assembled.

After stacks of the thin-plate positive electrodes housed in the bag-shape separators and thin-plate negative electrodes are stacked, the stacks are bound together with fixing members 5, such as adhesive tape, which are attached from one end of a stack surface, which is one side of the stacks, to the opposite stack surface.

Through the processes described above, the battery element 4 can be made in such a way as not to allow for any positional shift of the thin-plate positive electrodes housed in the bag-shape separators and thin-plate negative electrodes.

FIG. 8 is a schematic diagram for explaining the positional relationship between the thin-plate positive and negative electrodes and the separator.

Figure 8A:
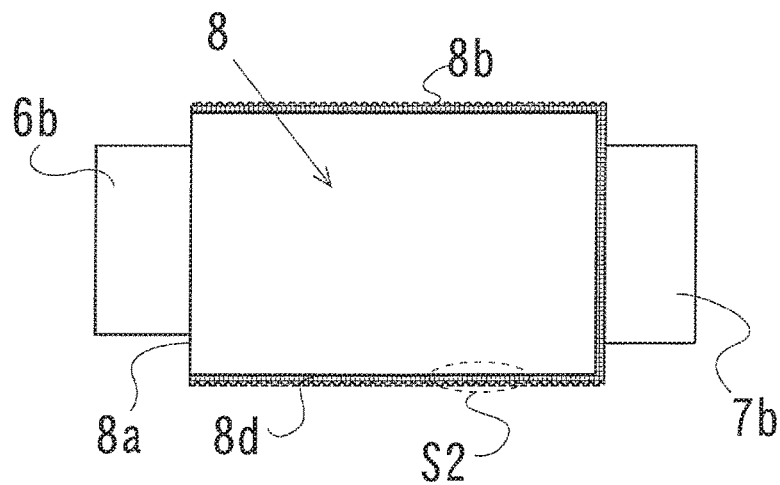
FIG. 8 is a diagram for explaining how bag-shape separators, into which positive electrodes of a lithium ion secondary battery of the present invention have been inserted, and negative electrodes are stacked.
Figure 8B:
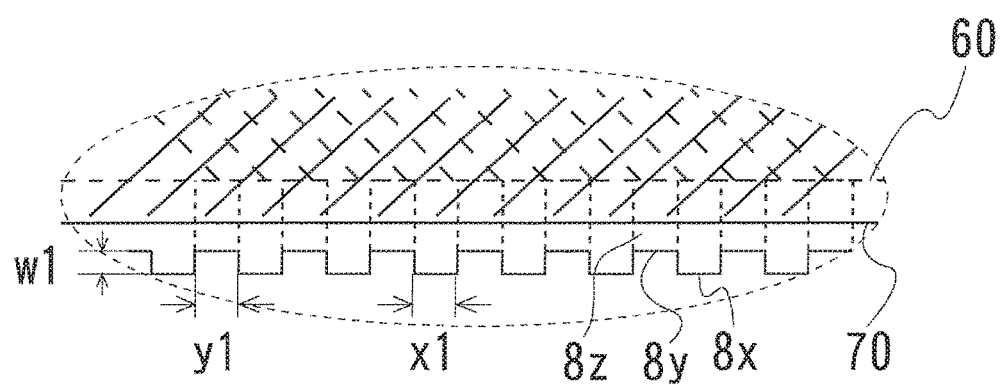

FIG. 8A is a diagram in which the stack of a bag-shape separator, which houses a thin-plate positive electrode, and a thin-plate negative electrode sheet is seen in a direction perpendicular to the stack surface. FIG. 8B is an enlarged view of the portion surrounded by broken line S2 in FIG. 8A.

As shown in FIG. 8B, in the battery element of the lithium ion secondary battery of the present invention, all the convex portions 8x and concave portions 8y created by heat-sealing on the outer periphery of the bag-shape separator are positioned outside an outer peripheral portion 70 of the thin-plate negative electrode and an outer peripheral portion 60 of the thin-plate positive electrode.

The stacked lithium ion secondary battery of the present invention employs a plurality of separators. According to this configuration, when external vibration or shock causes the battery element to contact with the exterior body, it is the convex portions 8x that first come in contact with the exterior body. In this manner, the convex portions 8x function as cushioning material.

It is preferred that the average w1 of distances of differences of the peaks of the adjacent convex portions 8x and concave portions 8y be greater than or equal to 0.3 mm and less than or equal to 3 mm, and that the width x1 of the convex portions be greater than the width y1 of the concave portions.

According to this configuration, even when external vibration or shock is exerted, the convex portions 8x mitigate the shock to the end portions 70 of the negative electrode sheets, prevent the breakage of the negative electrode sheets and the dropping of the negative electrode active material. This also reduces the shock to the concave portions 8y, thereby reducing the impact on the end portions 60 of the adjacent positive electrode sheets.

Portions of the bag-shape or tubular separators that are to be heat sealed are formed at least on one of the long sides adjacent to the side from which the positive or negative electrode terminals are taken out. When the battery element is formed, the area formed by the convex portions on the one side is set greater than or equal to 4 mm². This configuration is particularly effective.

It is preferred that a region where the sealing portion 8z is formed overlap with an outer peripheral side of the thin-plate negative electrode sheet. It is necessary to fix the sides of the battery element with adhesive tape, so that the stacked separators and electrode sheets do not shift. In order to prevent such a shift of the stack, a tightly stretched tape should be attached. Accordingly, if the separators are simply larger than the negative or positive electrodes, the separators could be bent along the electrodes when the adhesive tape is attached.

If the separators are too large, this leads to an improvement in the cushioning performance. However, the energy density per unit volume of the lithium ion secondary battery would decrease. It is possible to prevent a decrease in the energy density by aligning the region where the sealing portion 8z is formed with the outer peripheral side of the negative electrode sheet. Moreover, even when the tape is attached to the side to fix the stack, the separators will not be bent along the outer periphery of the negative electrodes. In this manner, it is possible to prevent a decrease in the cushioning performance.

FIG. 9 is a diagram for explaining a flexible exterior body in which a film that is good in heat-sealing performance is stacked on one side of aluminum film and a strong synthetic resin film on the other side.

On a flexible exterior body 10, a battery element housing section 9, which is designed to house a battery element, is made by press working or the like.

Figure 9A:
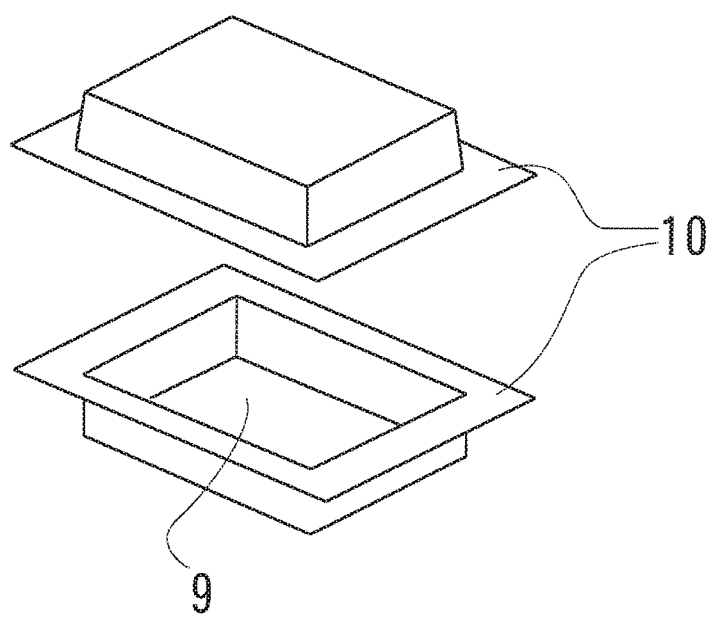
FIG. 9 is a diagram for explaining an exterior body according to an example of a lithium ion secondary battery of the present invention.
Figure 9B:
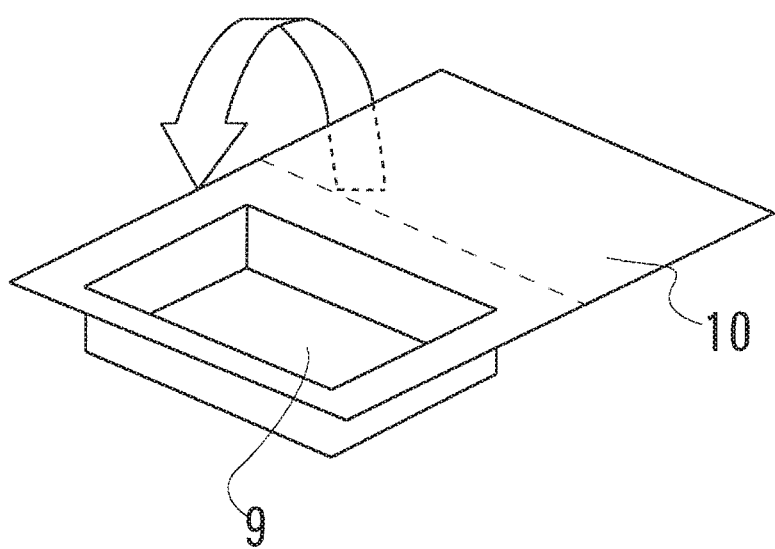

As shown in FIG. 9A, the battery element can be sealed by putting two flexible exterior bodies 10 together. Instead, as shown in FIG. 9B, one flexible exterior body 10 may be folded to seal a battery element.

Instead of the film exterior body, an aluminum plate may go through a drawing process or the like to form a battery element housing section inside (not shown).

In the battery element housing section formed on the exterior body, battery elements, electrolyte and parts of positive and negative electrodes electrically connected to the battery element are housed and sealed to create the lithium ion secondary battery shown in FIG. 1.

EXAMPLES

Example 1

Two separators, made mainly of polypropylene with a thickness of 25 µm, were put together; three sides on the periphery were, at intervals of 3 mm, 0.5 mm in width along the outer peripheral sides and 2 mm in width of vertical way; intermittent heat-sealing was conducted so that the difference w1 of distances of the peaks of the adjacent convex and concave portions was 0.4 mm. In this manner, a bag-shape separator with concave and convex portions on the outer periphery was created.

A thin-plate positive electrode, which was made of aluminum foil, was inserted into the bag-shape separator: The positive electrode active material coating section was 120 mm in longitudinal direction, 65 mm in the direction perpendicular to the longitudinal direction and 20 µm in thickness. Through the opening of the bag, the positive electrode active material non-coating section was exposed. As for the positive electrode active material coating layer, slurry was applied with a thickness of 130 µm and was dried and compressed: the slurry was a mixture of 40 percent by mass of lithium nickel oxide, 51 percent by mass of lithium manganese oxide, 3 percent by mass of carbon black, which was as conductive aid, and 6 percent by mass of PVdF, which was as binder.

The negative electrode active material coating section of the thin-plate negative electrode was 125 mm in longitudinal direction, 68 mm in the direction perpendicular to the longitudinal direction, and 10 µm in thickness. Such a negative electrode, which was made of copper foil, was used.

As for the active material coating section of the thin-plate negative material, slurry was applied with a thickness of 100 µm and was dried: the slurry was a mixture of 91 percent by mass of graphite, 3 percent by mass of carbon black, which was as conductive aid, and 6 percent by mass of PVdF, which was as binder.

Fourteen such thin-plate positive electrodes, which were inserted into bag-shape separators created, and 15 such thin-plate negative electrodes were prepared. The electrodes were stacked in such a way that they were aligned in longitudinal direction and that one of the negative electrode sheets was in the outermost layer.

As for the positional relationship between the thin-plate positive electrodes, the thin-plate negative electrodes and the bag-shape separators, the outer periphery of the negative electrode sheets were disposed deeper into the separator than the outer periphery of the bag-shape separator. The outer periphery of the positive electrode sheets housed inside the bag-shape separators were disposed closer to the inner side than the negative electrode sheets.

From the surface of one outermost-layer thin-plate negative electrode to the surface of the other outermost-layer thin-plate negative electrode via the longitudinal-direction sides, an adhesive tape with a width of 20 mm was attached: the adhesive tape had a polypropylene base on which an acrylic adhesive layer was formed. In this manner, the electrodes were firmly stacked so as not to shift.

Then, electrode terminals were attached. Ten lithium ion secondary batteries, which were housed in an exterior body made of film-like exterior material along with the electrolyte containing cyclic carbonate and LiPF6, were produced.

Evaluation Tests

The produced 10 secondary batteries were set in such a way that their stack direction was parallel to the ground. The secondary batteries were dropped onto the concrete floor from each of the two sides different from the sides from which the terminals were being pulled out. It was confirmed whether the active material came off the positive or negative electrode sheets. The test results are shown in Table 1.

Example 2

Example 2 was different from Example 1 only in that w1 was 0.3 mm. Similar measurements and evaluations to those in Example 1 were conducted. The results are shown in Table 1.

Comparative Example 1

Comparative Example 1 was different from Example 1 only in that it used different heat-sealing conditions from Example 1 and that the difference w1 of distances of the peaks of the adjacent convex and concave portions was set at 0.2 mm. Lithium ion secondary batteries were made in a similar way to that of Example 1, tests were carried out as shown in Table 1.

TABLE 1

|  | Positive electrode active material fall-off situation | Positive electrode active material fall-off amount |
|---|---|---|
| Example 1 | 0/10 | 0/10 |
| Example 2 | 0/10 | 0/10 |
| Comparative Example 1 | 2/10 | 1/10 |

INDUSTRIAL APPLICABILITY

In the lithium ion secondary battery of the present invention, concave and convex portions are formed on the outer periphery of a separator housing a thin-plate positive electrode, and both the concave and convex portions are positioned outside the outer periphery of the negative electrode. Therefore, it is possible to provide a lithium ion secondary battery with excellent characteristics whose battery characteristics are not severely affected even when being subjected to shock caused by dropping or the like.

EXPLANATION OF REFERENCE SYMBOLS

1: Lithium ion secondary battery
2: Positive electrode terminal
2a: Positive electrode terminal exposure portion
3: Negative electrode terminal
3a: Negative electrode terminal exposure portion
4: Battery element
5: Fixing member
6: Thin-plate positive electrode
6a: Positive electrode active material coating section
6b: Positive electrode active material non-coating section
7: Thin-plate negative electrode
7a: Negative electrode active material coating section
7b: Negative electrode active material non-coating section
8: Separator
8a, 8b, 8c, 8d: Side
8x: Convex portion
8y: Concave portion
8z: Heat-sealing portion
10: Exterior body
w1: Average of distances of differences of peaks
x1: Width of convex portion
y1: Width of concave portion
60: End portion of positive electrode sheet
70: End portion of negative electrode sheet

The invention claimed is:

1. A stacked lithium ion secondary battery comprising:
an exterior body that houses electrolyte and battery elements stacked via thin-plate positive electrodes coated with positive electrode active material, thin-plate negative electrodes coated with negative electrode active material, and separators, wherein:
the separator is a flat bag or flat tube with at least one side of an outer periphery thereof intermittently heat-sealed;
the heat-sealed side is provided with concave and convex portions made up of straight lines or curves or a combination of straight lines and curves;
the outer periphery of the separator made with the concave and convex portions is positioned outside the outer periphery of the negative electrode along with the concave and convex portions;
the outer periphery of the heat-sealed side of the separator provided with the concave and convex portions is positioned outside a negative electrode end;
a sealing portion of the heat-sealed side of the separator provided with the concave and convex portions is positioned inside the concave portions protruding toward the inside of the battery elements;
the sealing portion is overlapped with the outer peripheral portion of the negative electrode; and
the outer periphery of the negative electrode is positioned outside the outer periphery of the positive electrode housed in the separator.

2. The stacked lithium ion secondary battery according to claim 1, wherein:
the stacking is conducted at a position where a heat-sealed portion on the heat-sealed side overlaps with the outer periphery of the negative electrode.

3. The stacked lithium ion secondary battery according to claim 1, wherein:
a fixing member is attached to the battery element; and
the fixing member is disposed on a plane where at least the side with the concave and convex portions formed is located.

4. The stacked lithium ion secondary battery according to claim 1, wherein:
a difference of differences of peaks of the concave and convex portions is greater than or equal to 0.3 mm and less than or equal to 3 mm.

* * * * *